No. 725,509. PATENTED APR. 14, 1903.
F. W. THOMPSON.
SCENIC APPARATUS.
APPLICATION FILED NOV. 15, 1902.
NO MODEL. 5 SHEETS—SHEET 1.

WITNESSES: INVENTOR
Frederick W. Thompson
BY
ATTORNEYS.

No. 725,509. PATENTED APR. 14, 1903.
F. W. THOMPSON.
SCENIC APPARATUS.
APPLICATION FILED NOV. 15, 1902.
NO MODEL. 5 SHEETS—SHEET 3.

WITNESSES:
A. R. Appleman Jr.
C. V. Ferguson

INVENTOR
Frederic W. Thompson
BY
ATTORNEYS.

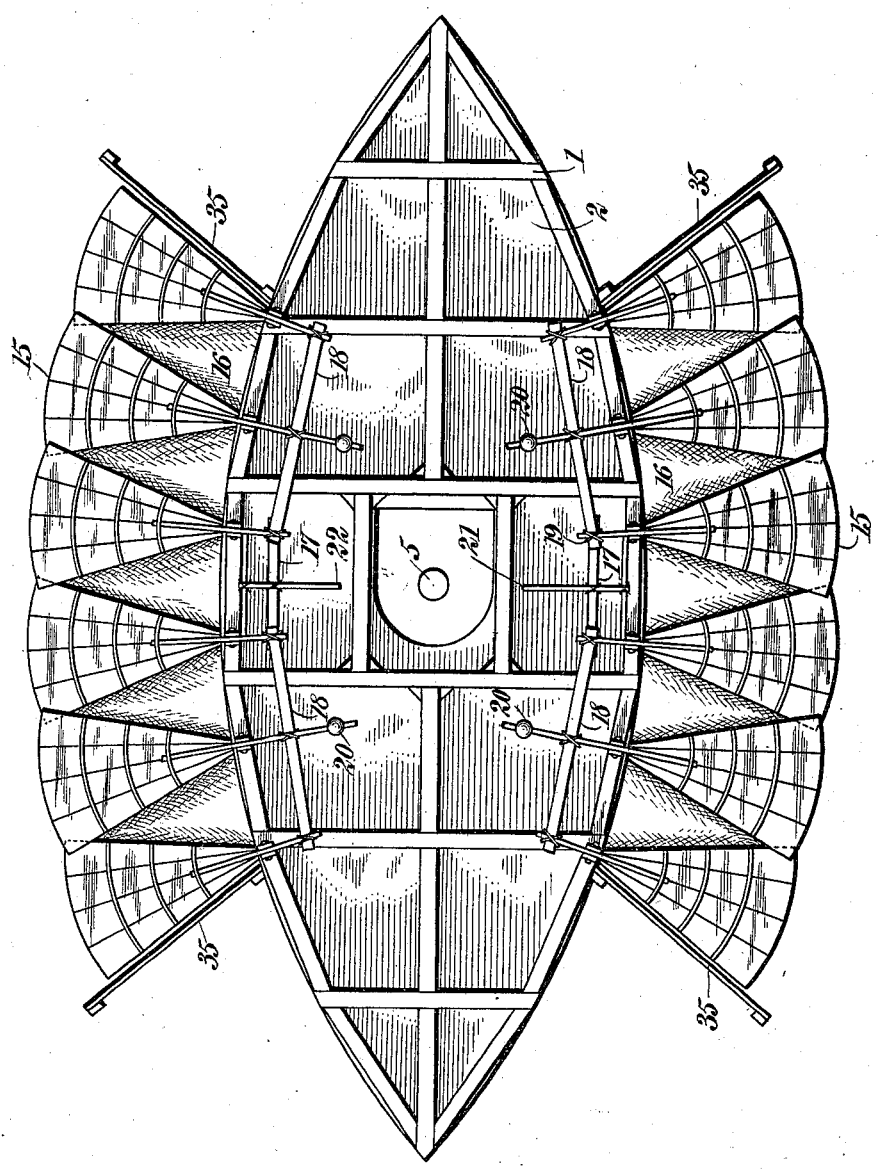

No. 725,509. PATENTED APR. 14, 1903.
F. W. THOMPSON.
SCENIC APPARATUS.
APPLICATION FILED NOV. 15, 1902.
NO MODEL. 5 SHEETS—SHEET 5.
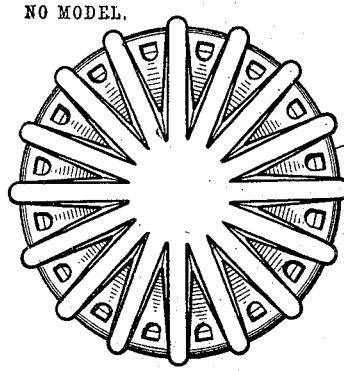
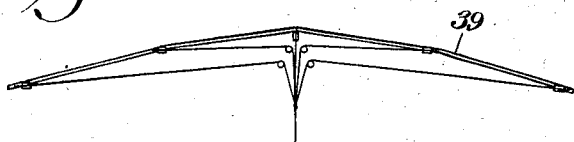
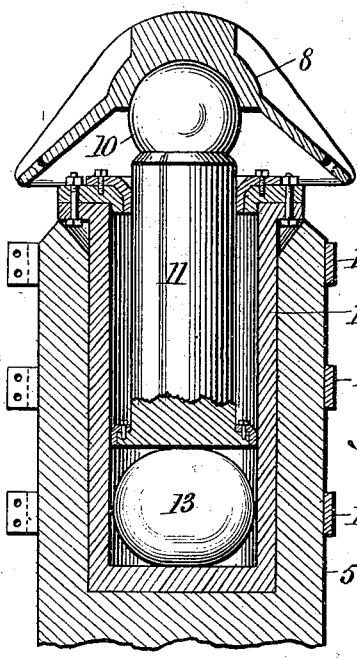
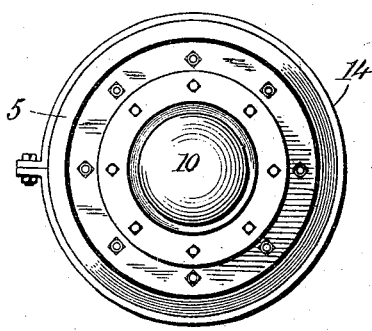
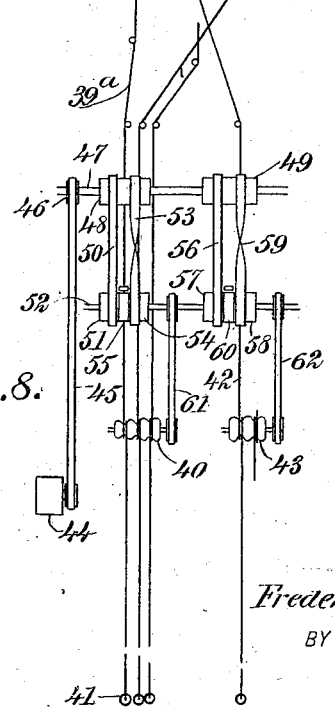
WITNESSES:
INVENTOR
Frederick W. Thompson
BY
ATTORNEYS.

UNITED STATES PATENT OFFICE.

FREDERICK WILLIAM THOMPSON, OF NEW YORK, N. Y.

SCENIC APPARATUS.

SPECIFICATION forming part of Letters Patent No. 725,509, dated April 14, 1903.

Application filed November 15, 1902. Serial No. 131,521. (No model.)

*To all whom it may concern:*

Be it known that I, FREDERICK WILLIAM THOMPSON, a citizen of the United States, and a resident of the city of New York, Coney Island, borough of Brooklyn, in the county of Kings and State of New York, have invented a new and Improved Scenic Apparatus, of which the following is a full, clear, and exact description.

This invention relates to improvements in scenic apparatus, the object being to provide a device comprising a rocking platform having wings to represent an aerial ship, in connection with scenic effects so arranged as to give to passengers the illusion of gradually ascending and descending through the air.

I will describe a scenic apparatus embodying my invention and then point out the novel features in the appended claims.

Figure 1:
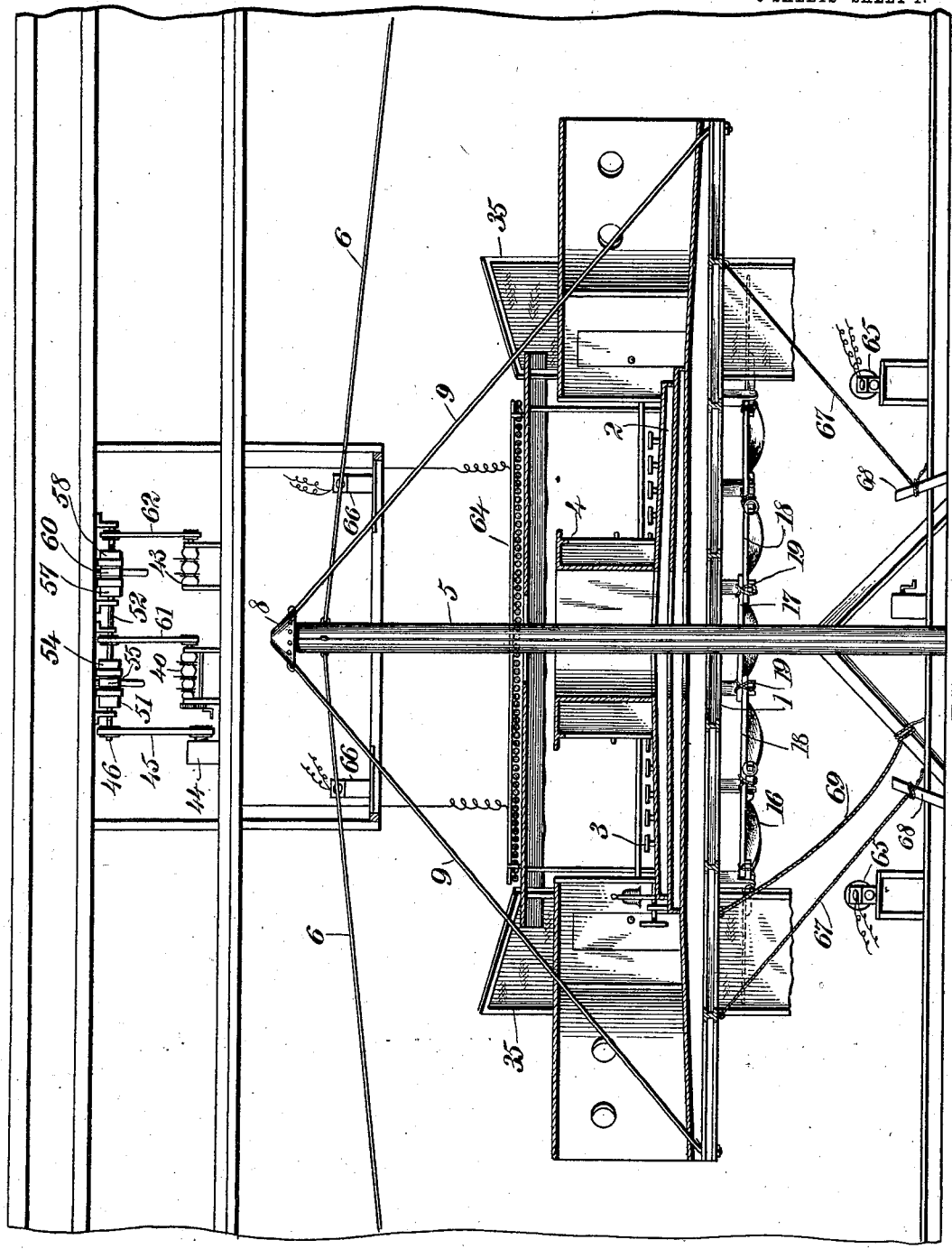
Figure 2:
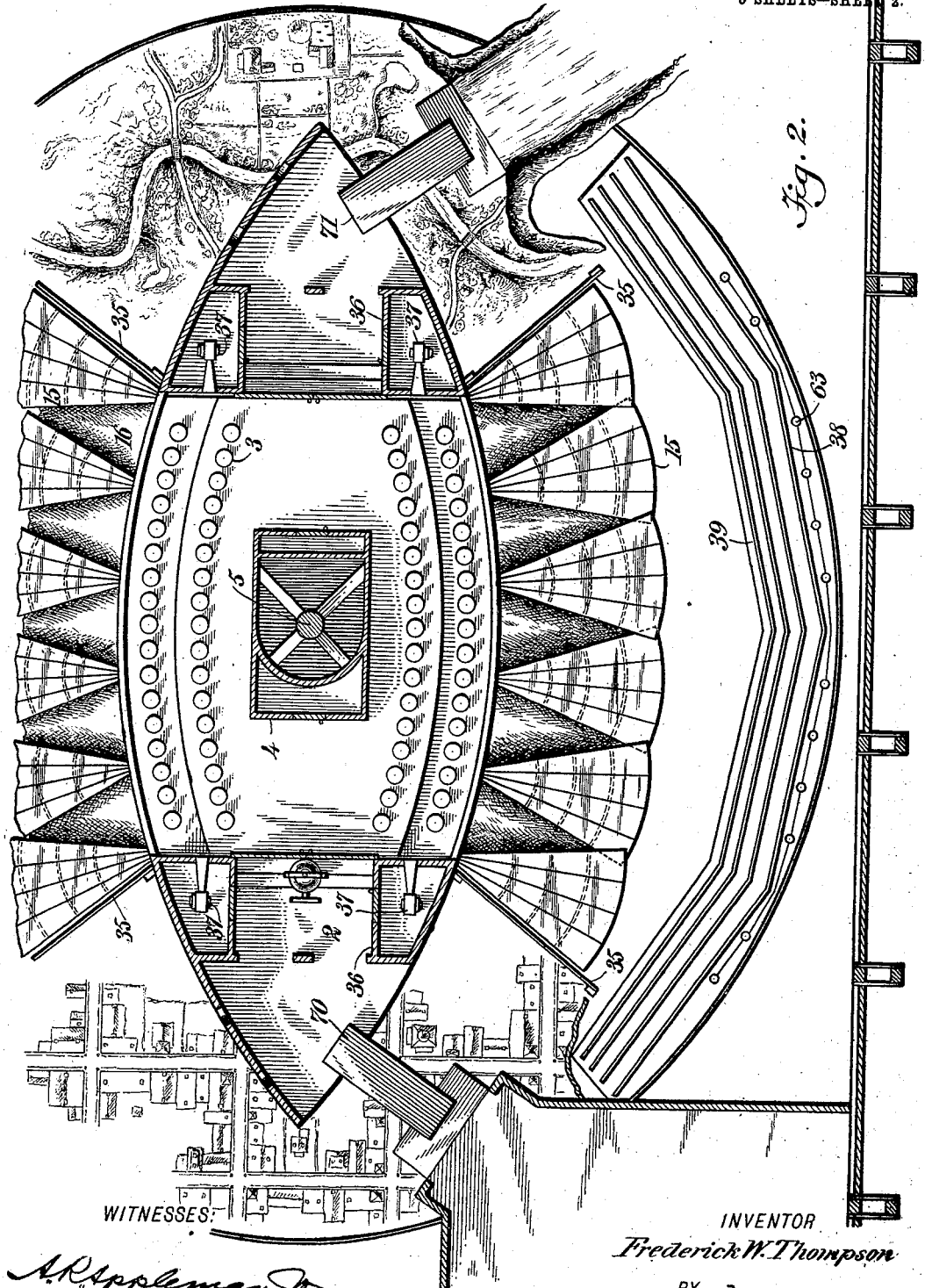
Figure 3:
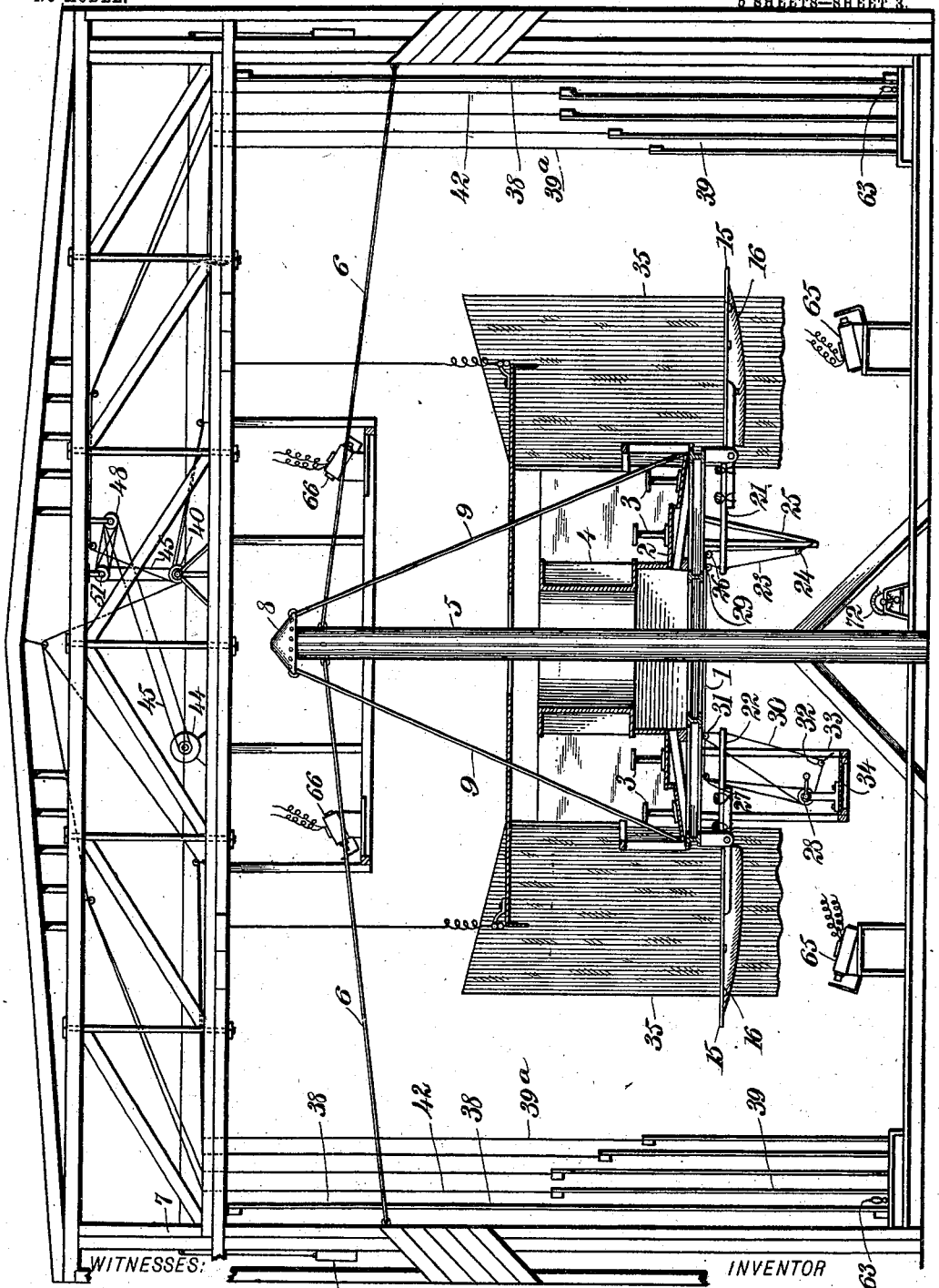

Figure 1 is a longitudinal section of the scenic apparatus embodying my invention. Fig. 2 is a plan view thereof, partly in section. Fig. 3 is a transverse section. Fig. 4 is a bottom plan view. Fig. 5 is a diagrammatic view showing scene-shifting mechanism. Fig. 6 is a plan view of the platform or deck-supporting device employed. Fig. 7 is a sectional elevation thereof, and Fig. 8 is a plan thereof with the cap removed.

The device comprises a framework 1, on which is placed a platform or deck 2, and on this deck are seats 3 for passengers. Arranged on the deck is the representation of a deck-house 4, which is centrally open, the opening being in alinement with an opening or openings through the deck. Extended upward through the openings is a fixed mast 5, which is rigidly held by guys 6, extended to suitable connections with the building 7, in which the device is placed. A cap 8 has oscillating connection with the upper end of the mast 5, and from this cap cables or rods 9 extend to connections with various parts of the deck or with the frame of the apparatus. The cap 8 oscillates on a ball-bearing 10, mounted on a shaft 11, extended into a boxing 12, placed in a longitudinal bore at the upper end of the mast, and the lower end of this shaft 11 rests on an antifriction-ball 13. As the mast 5 is made of wood, it is strengthened at its upper end by bands 14.

Arranged on each side of the deck is a series of wings 15 of substantially triangular form, and the adjacent wings are connected by bagging or sagging material 16, which may be painted to give atmospheric effect. These wings are mounted to swing on the frame 1, and the center wings have their inwardly-extended stems connected by a bar 17. The pairs of outer wings are connected by bars 18, and these bars 18 have flexible connections 19 with the bar 17. These flexible connections may consist of rope or light wire cables. The stems of two of the outer wings are extended inward beyond the bars 18 and provided with counterbalanced balls or weights 20. From the bar 17 arms 21 22 extend inward, and from the arm 21 a cable 23 extends downward around a pulley 24, attached to a hanger 25, and thence over a pulley 26, secured to the frame 1, thence over a pulley 27 at the opposite side of the frame. From this pulley the rope extends around a drum 28, then back over the pulley 27 to a pulley 29 on the frame 1, and to connection with the said arm 21. A rope 30 extends around the drum 28, and thence around a pulley 31, attached to the frame, and then around a pulley 32, attached to a post 33, depending from the frame, and to the lower ends of the several posts like 33 is secured a platform 34, on which the drum 28 is mounted.

By imparting an oscillating rotary motion to the drum 28 it is obvious that up-and-down motion will be imparted to the wings. At the ends of the series of wings are screens 35, which are suitably painted and are designed to cut off the view at the ends of the deck, or, rather, at the ends of the wings.

A floor or a canvas below the apparatus is painted to represent the ground and buildings thereon, as clearly shown in Fig. 2. Arranged in compartments 36 at the ends of the deck are fans 37 for producing the effect of wind. Arranged at opposite sides of the building are stationary scenic screens 38, on which cloud effects or the like are painted, and inward of each screen 38 is a series of vertically-movable screens 39. These movable screens are variously painted to give the effect of different strata of clouds or the like and are movable one independently of another. From each movable screen a rope 39$^a$ extends to winding-drums placed in the upper portion of the building. It may be here stated that the three inner screens at each side are painted to illustrate the moon and its phases, while the outer one is painted to give earth effects. The three inner screens move at different rates of speed, and to provide for this result I employ a drum 40 of conical or tapered form. The ropes for the inner screens have one or more turns around the drum 40, and connected to the ends are weights 41. From the drums the ropes extend around pulleys suitably placed, and each rope has four branch connections with its screen, as indicated in Fig. 5. The outer movable screens are attached in a similar manner to ropes 42, which extend around a drum 43 and around pulleys suitably placed.

The drums are operated through the medium of a motor 44. From this motor a band 45 extends to a pulley 46 on a shaft 47, and on this shaft are pulleys 48 49. From the pulley 48 a band 50 extends to a connection with a pulley 51, loosely mounted on a shaft 52, and a cross-belt 53 connects the pulley 48 with a pulley 54, loosely mounted on said shaft 52. Arranged between the pulleys 51 and 54 is a pulley 55, rigidly connected to the shaft 52. From the pulley 49 a band 56 extends to a pulley 57, loose on the shaft 52, and also extending from the pulley 49 to a connection with a pulley 58, loose on the shaft, is a crossed belt 59. Arranged between the pulleys 57 58 and secured to the shaft is a pulley 60. The drum 40 is driven from the shaft 52 through the medium of a belt 61, and the drum 43 is driven from said shaft by a belt 62.

By means of the straight belts and the crossed belts it is obvious that the scenic screens may be caused to move in opposite directions to give the effect of ascending or descending. When moving the scenes in one direction, the belts 50 and 56 are to be shifted by ordinary shifting-levers into connection with the pulleys 55 60. When moving the scenes in the opposite direction, the belts 53 59 are to be moved or shifted into connection with the said fixed pulleys. At the base of the fixed screens 38 electric lights 63 may be placed, and arranged above the deck and carried by suitable framework are electric lamps 64, the globes of the lamps being of different colors—for instance, red and blue—so that by manipulating the switchboard various effects may be given. Other effects may be produced by stereopticons 65, arranged below the device, and stereopticons 66, arranged above the same.

When the deck is at rest, it is held or anchored by means of cables 67, attached to the framework and secured to stakes 68. When the apparatus is in operation, these anchor-cables obviously must be released from the stakes, and then a rocking motion may be imparted to the deck through the medium of a rope 69, which is manually operated.

In the operation when the deck is at rest passengers will pass thereon over a gang-plank 70. Then after the "ascension" and "descent" the passengers pass out over a gang-plank 71. Upon loosening the anchor-ropes rocking motion is to be imparted to the deck, as before mentioned, and at the same time the movable scenic screens are operated as are also the light-producing devices.

To produce a sound simulating the sound of wind, a buzzer 72 is arranged in the building.

Having thus described my invention, I claim as new and desire to secure by Letters Patent—

1. In a scenic apparatus, a rocking deck, and vertically-movable scene-screens at opposite sides of the deck, substantially as specified.

2. In a scenic apparatus, a rocking deck, fixed scene-screens, and vertically-movable scene-screens at opposite sides of the deck, substantially as specified.

3. In a scenic apparatus, a rocking deck, wings on opposite sides of said deck, means for imparting motion to said wings, and movable scene-screens at opposite sides of the deck, substantially as specified.

4. In a scenic apparatus, a rocking deck, wings on opposite sides of the deck, means for imparting motion thereto, screens extended from the deck at the ends of the series of wings, and movable scene-screens at opposite sides of the deck, substantially as specified.

5. In a scenic apparatus, a rocking deck, movable scene-screens at opposite sides of the deck, wings attached to opposite sides of the deck, means for imparting motion to said wings, screens extended outward from the deck at the ends of the wings, and a mast on which the deck is mounted to rock, substantially as specified.

6. In a scenic apparatus, a deck having an opening, a mast extended upward through said opening, a cap mounted to rock on the upper end of said mast, rod connections between said cap and the deck and movable scenic devices at opposite sides of the deck, substantially as specified.

7. A scenic apparatus, comprising a deck having an opening, a deck-house thereon, a mast extended through the opening of the deck, and through the deck-house, a bearing-ball arranged at the upper end of the mast, a cap mounted to rock on said ball, connections between said cap and the deck and movable scenic devices at opposite sides of the deck, substantially as specified.

8. In a scenic apparatus, a deck having an opening, a mast extended through said opening, the said mast having a longitudinal bore at its upper end, a sleeve arranged in said bore, a shaft extended into the sleeve, a ball-bearing between the lower end of the shaft and the lower end of the sleeve, a ball-bearing on the upper end of the said shaft, a cap mounted to rock on said last-named ball-bearing, and connections between the cap and the deck, substantially as specified.

9. In a scenic apparatus, a deck mounted to rock, wings on the opposite sides of said deck, means for imparting swinging motion to said wings, scene-screens at opposite sides of the deck, illuminating devices variously arranged relatively to the deck, and the variously-colored lights, substantially as specified.

10. In a scenic apparatus, a rocking deck, wings on opposite sides of said deck, means for imparting motion to the wings, scene-screens arranged at opposite sides of the deck, and fans or blowers mounted on the deck near its ends, substantially as specified.

11. In a scenic apparatus, a building, a rocking deck in the building, vertically-movable screens in the building at opposite sides of the deck, winding-drums arranged in the upper portion of the building, connections between said winding-drums and the screens, and a motor for operating the drums, substantially as specified.

12. In a scenic apparatus, a building, a rocking deck in the building, vertically-movable scene-screens in the building at opposite sides of the deck, and means for raising and lowering the said screens at different rates of speed, substantially as specified.

In testimony whereof I have signed my name to this specification in the presence of two subscribing witnesses.

FREDERICK WILLIAM THOMPSON.

Witnesses:
ELMER S. DUNDY,
JOHN T. EVANS.